US012705956B2

(12) United States Patent
Tang et al.

(10) Patent No.: US 12,705,956 B2
(45) Date of Patent: Aug. 11, 2026

(54) SELF-SERVICE TERMINAL (SST) PREDICTIVE ERROR ANALYSIS

(71) Applicant: NCR Voyix Corporation, Atlanta, GA (US)

(72) Inventors: Michael Jiang Tang, Alpharetta, GA (US); Yingying Cai, Atlanta, GA (US); Kun Zhu, Smyrna, GA (US)

(73) Assignee: NCR Voyix Corporation, Atlanta, GA (US)

( * ) Notice: Subject to any disclaimer, the term of this patent is extended or adjusted under 35 U.S.C. 154(b) by 2 days.

(21) Appl. No.: 18/428,804

(22) Filed: Jan. 31, 2024

(65) Prior Publication Data

US 2025/0246051 A1 Jul. 31, 2025

(51) Int. Cl.
*G07F 19/00* (2006.01)
*G06Q 10/20* (2023.01)

(52) U.S. Cl.
CPC .......... *G07F 19/209* (2013.01); *G06Q 10/20* (2013.01)

(58) Field of Classification Search
CPC .... G06Q 20/1085; G06Q 20/18; G06Q 10/20; G07F 19/209
USPC ...................... 235/379, 383, 376; 705/16, 43
See application file for complete search history.

(56) References Cited

U.S. PATENT DOCUMENTS 8,495,424 B1 * 7/2013 Vannatter .............. G07F 19/209 714/48
2008/0059120 A1 * 3/2008 Xiao ................... G06F 11/0748 702/187
2011/0125615 A1 * 5/2011 Shirbabadi ........... G06Q 10/087 705/28
2011/0313810 A1 * 12/2011 Herzberger ........ G03G 15/5079 705/7.24
2013/0155834 A1 * 6/2013 Yingling, Jr. .......... G06Q 10/04 370/216
2015/0178670 A1 * 6/2015 Angus .................... G06Q 20/18 705/28
2019/0096196 A1 * 3/2019 Cifarelli ................. G06N 20/10
2020/0388116 A1 * 12/2020 Satanal ................ G06Q 20/407

(Continued)

FOREIGN PATENT DOCUMENTS

EP 0977163 2/2000

OTHER PUBLICATIONS

"European Application No. 24223735.2 Extended European Search Report mailed on Jan. 31, 2025", 10 pgs.

*Primary Examiner* — Suezu Ellis

(74) *Attorney, Agent, or Firm* — Schwegman Lundberg & Woessner, P.A.

(57) ABSTRACT

A cash tender module (CTM) of a self-service terminal (SST) records transaction media usage and error or warning codes for media peripheral devices of the SST in one or more log files. The log files are processed to discover patterns and relationships between the error/warning codes. Predicted error/warning codes are generated for the peripherals based on the patterns and relationships. Service records are automatically and proactively generated based on the predicted error/warning codes. In an embodiment, the service records include links to knowledge articles that provide step-by-step actions to resolve the error/warning codes. In an embodiment, real-time media counts by denomination are render into a dashboard interface for monitoring in real time the media in the SST.

17 Claims, 3 Drawing Sheets

(56) References Cited

U.S. PATENT DOCUMENTS

2021/0374636 A1 12/2021 Rojas
2024/0395115 A1* 11/2024 Singh .................... G06T 19/006

* cited by examiner

SELF-SERVICE TERMINAL (SST) PREDICTIVE ERROR ANALYSIS

BACKGROUND

The cash tender module (CTM) is an integral part of self-checkout (SCO) machines, which facilitate the acceptance and dispensing of cash tenders. Currently, reactive approaches are used to manage CTMs, where incidents are only reported after an issue occurs. This approach is unreliable because it relies on store associates to notify the service provider before a customer engineer can be dispatched to the site, causing poor resource management and increased dispatch costs to the service provider.

DETAILED DESCRIPTION

Figure 1:
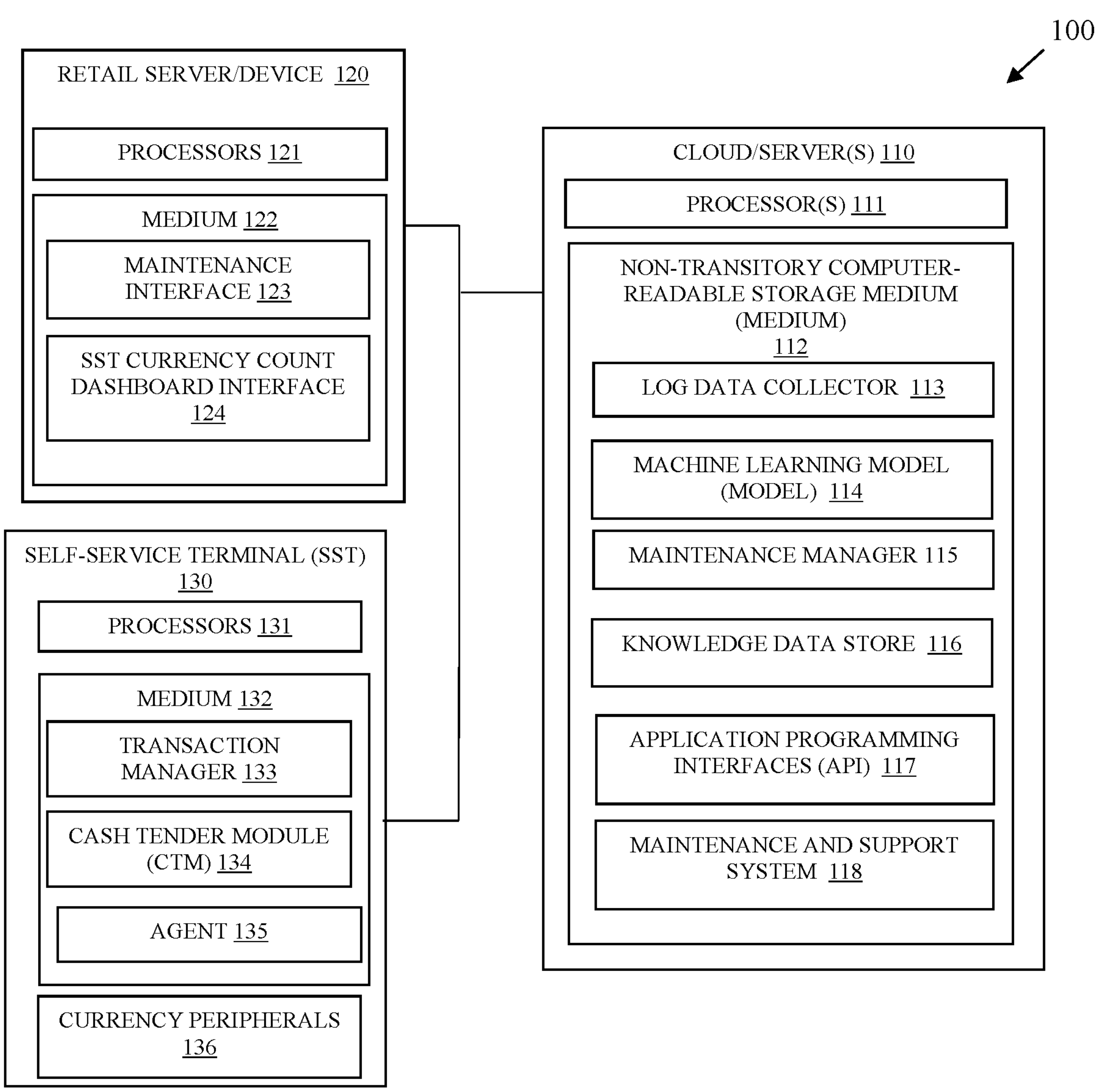
FIG. 1 is a diagram of a system for self-service terminal (SST) predictive error analysis, according to an example embodiment.

In addition to the aforementioned issues associated with reactive management approaches when managing cash tender modules (CTMs) of self-service terminals (SSTs) or self-checkouts (SCOs), there is very little reporting that exists in the industry for store managers or associates to determine an overall health and cash levels of the SCO lanes in the store. This makes it difficult to monitor issues and track the usage of the lanes.

A CTM is a software module of that is responsible for controlling the cash-related peripheral devices of an SST when depositing and dispensing cash and/or coins during transactions at an SST. A variety of conditions can cause the CTM to malfunction, such as when cash and/or coin levels are insufficient to dispense change during a self-service transaction, when cash and/or coin levels are levels are full such that no further cash and/or coins can be deposited for a self-service transaction, and/or when a variety of faults, incidents, or jams occur with the currency peripherals of the SST. When the CTM is offline, the SST is unavailable for customer use or at least unavailable for any cash-based transaction. This can cause customer backups at available SSTs or increase customer queues at cashier-assisted point-of-sale (POS) terminals.

The teachings provided herein alleviate these shortcomings by sending logs or log data collected by the CTMs from the currency peripherals of the SSTs to a cloud-based service for analysis and real-time status and currency/coin levels are reported back to the stores associated with the SSTs. In addition, the cloud service provides real-time log data to a machine learning algorithm (hereinafter just "model) to predict when a maintenance action is going to be needed on a given currency peripheral of a given SST before the currency peripheral experiences a maintenance issue. The cloud service further links error codes to existing knowledge articles associated with the currency peripheral devices and proactively provides the known articles in real-time to store staff and/or service engineers to assist them in step-by-step resolution of the error codes.

Moreover, the cloud service interacts with a maintenance and support system to identify when service engineers are scheduled to perform maintenance on a given SST of a store and piggyback on that service call maintenance or support resolution on one or more other SSTs of the store based on the predictive time in which the one or more other SSTs are expected to experience a maintenance or support issue. For example, if a service engineer is being dispatched to a store to performance maintenance and support on a first SST of the store and the model is predicting that a second SST of the store will likely require maintenance and support a week after the service call, the cloud service adds the maintenance and support of the second SST to the service engineer's tasks when visiting the store for attending to the first SST. In this way, service calls are reduced to the store improving the efficiencies of the support organization and reducing costs incurred by the store as well as ensuring high availability of the SSTs at the store.

The cloud service provides proactive error detection for currency peripherals of SSTs, provides real-time cash and coin counts through a dashboard interface back to the stores, automatically generates incident reports within a maintenance and support system based on predicted issues for the peripherals which has not yet occurred, distinguishes between soft and hard faults, and automatically piggybacks additional maintenance and support actions onto existing scheduled service calls to attend to predicted and impending issues for the SSTs of the store. The manner in which this is achieved is now discussed with reference to FIG. 1.

FIG. 1 is a diagram of a system, platform, and/or framework 100 (hereinafter just system 100") for SST predictive error analysis, according to an example embodiment. Notably, the components are shown schematically in simplified form, with only those components relevant to understanding of the embodiments being illustrated.

Furthermore, the various components (that are identified in system 100) are illustrated and the arrangement of the components are presented for purposes of illustration only. Notably, other arrangements with more or less components are possible without departing from the teachings of SST predictive error analysis as presented herein and below.

As used herein and below, the term "SST" is used interchangeably and synonymously with the term "SCO." This refers to a transaction terminal in which customers perform self-service transactions and are able to use currency to pay for the transactions at the SSTs. Notably, the SSTs also permit card-based payments for the transactions.

The term "media" as used herein is intended to mean currency. Currency includes cash/notes/bills and coins. Both cash and coins include a variety of denominations. For example, cash denominations for U.S. currency includes bills for $1, $5, $10, $20, $50, and $100; coin denominations for U.S. currency includes coins for 1 cent, 5 cents, 10 cents, 25 cents, 50 cents, and $1.

System 100 includes a cloud/server 110 (hereinafter just "cloud 110"), a plurality of retail servers or devices 120, and a plurality of SSTs 130. Cloud 110 includes at least one processor 111 and a non-transitory computer-readable storage medium (hereinafter just "medium") 112, which includes instructions for a log data collector 113, a model 114, a maintenance manager 115, an application programming interfaces (APIs) 117, and a maintenance and support system 118. The instructions when provided to and executed by processor 111 cause processor 111 to perform processing, functions, and/or operations discussed herein and below with respect to 113-115 and 117-118. Medium 112 also includes a knowledge store 116 and related interfaces for accessing and updating maintenance articles relevant to currency peripherals 136 of SSTs 130.

Each retail server or device 120 includes at least one processor 121 and a medium 122, which includes instructions for a maintenance interface 123 and an SST currency count dashboard interface 124. The instructions when provided to and executed by processor 121 cause processor 121 to perform the processing, functions, and/or operations discussed herein and below with respect to 123-124.

Each SST 130 includes at least one processor 131 and a medium 132, which includes instructions for a transaction manager 133, a CTM 134, and an agent 135. The instructions when provided to and executed by processor 131 from medium 132 cause processor 131 to perform the processing, functions, and/or operations discussed herein and below with respect to 133-135. The SST 130 also includes currency peripherals 136, such as currency cassettes (may also be referred to herein as "note box"), coin cassettes (may also be referred to herein as a "coin box"), an escrow, sensors for cash and/or coin validation, a check cassette, a currency reject cassette, currency and coin transports, a currency and/or coin infeed, and/or a currency and/or coin outfeed.

During operation of system 100, CTM 134 logs telemetry data captured by the CTM 134 during operation of the currency peripherals 136 in one or more log files. That is, as self-service transactions are processed by transaction manager 133, CTM 134 monitors peripherals 136 and records telemetry data in one or more log files. Currency peripherals 136 include both cash and coin peripherals of SST 130. The telemetry data includes, by way of example only, peripheral identifiers, error codes, warning codes, currency and coin by denomination deposited by transaction, currency and coin by denomination dispensed as change by transaction, and the like. Each currency or coin cassette by denomination is associated with a predefined optimal count based on the SST 130, the store associated with the SST 130, and/or the retailer associated with the store.

Agent 135 sends the log files to log data collector 113. Log data collector 113 stores the log files with identifiers that unique identify the SST 130, a store associated with the SST 130, and a retailer associated with the store.

Maintenance manager 115 monitors a data store or a storage location for the presence of new log files stored by log data collector 113. Maintenance manager 115 also maintains a collection of historical log files by SST 130, by store, and by retailer. Maintenance manager 115 further maintains a mapping between error codes and warning codes for each peripheral 136 to corresponding maintenance and support articles located within the knowledge data store 116.

Initially, maintenance manager 115 accesses maintenance and support system 118 to obtain historical service records, the corresponding error codes associated with the records, and the corresponding resolutions associated with the records for each peripheral 136. Additionally, historical log files produced by the CTM 134 are obtained.

Maintenance manager 115 trains model 114 using identifiers for the peripherals 136 and the log files as input to predict the error codes, warning codes, and resolutions, which are known to have occurred based on the historical service records. Maintenance manager 115 than tests the accuracy metrics in the predictions provided by the model 114 using a portion of the historical logs and historical service records. Once acceptable accuracy metrics are obtained, model 114 is deployed to production to be processed by maintenance manager 115 in order to provide a predictive maintenance cloud service to a given store of a given retailer associated with the SST 130.

The agent 135 continuously provides telemetry data stored in the logs on the SST 130 by CTM 134 to the log data collector 113. Log data collector 113 stores in the appropriate data store or store location on cloud 110 and maintenance manager 115 detects new log data being added to the data store or storage location.

Maintenance manager 115 provides the new log data received in near-real time as input to model 114. Model 114 provides as output a predicted error/warning code along with a future time in which the predicted error/warning code is likely to occur on a given SST 130.

Maintenance manager 115 interacts with maintenance and support system 118 to identify any scheduled service calls that are pending at a store associated with the given SST 130. The scheduled service calls can be associated with the given SST 130 or a different SST of the store. When the scheduled service call precedes the future time in which the predicted error/warning is likely to occur on the given SST 130, maintenance manager 115 modifies the scheduled service record to include service related to the predicted error/warning on the given SST 130. This piggybacks on an already scheduled service call to the store and includes service for the predicted error/warning on the given SST; thereby, reducing service calls by the service organization and reducing service expense of the store/retailer.

When maintenance manager 115 identifies that are no scheduled service calls to the store from the maintenance and support system, maintenance manager 115 creates a new service record for the predicted error/warning within the maintenance and support system 118. This is done without staff of the store having to wait until the error/warning occurs on the given SST 130 and then manually report the error/warning via maintenance interface 123. That is, maintenance manager 115 proactively and automatically schedules the service call for the predicted error/warning without any action of staff of the store and before the CTM 134 reports the error/warning code on the SST 130.

Additionally, maintenance manager 115 uses the predicted error/warning code to link to detailed maintenance and support articles for the corresponding peripheral 136 in the knowledge data store 116. Maintenance manager 115 adds the link to the detailed maintenance and support articles to the service record in the maintenance and support system 118. In this way, when the service engineer is on the service call to the store, the service engineer has access to the resolution and detailed instructions on how to resolve the error/warning code.

Still further, maintenance manager 115 continuously monitors and maintains real-time currency and coin counts by denomination and per SST 130 using the telemetry data provided in the log files produced by CTM 134. Maintenance manager 115 renders the real-time currency and coin counts by denomination per SST 130 in real time directly within the SST currency count dashboard interface 124 on retail server or device 120 using API 117. Thus, store managers can view each SST's real-time currency and coin counts by denomination in real time for purposes of making replenishment or currency and coin removals from a given currency or coin box peripheral 136 of a given SST 130 (i.e., currency and coin removals when a given currency or coin box peripheral 136 is at a max capacity such that removal is required). This is also an improvement over the ad hoc approaches used by store managers today because cash-based services need to be scheduled and corresponding SSTs 130 taken out of service to perform media replenishment and removal. Oftentimes it is only when an SST 130 refuses to accept a currency or coin deposit or is unable to provide a currency or coin deposit before a store manager realizes media replenishment or removal are needed, which means the SST 130 is out of service for longer than it could and should have been. Furthermore, by providing the real time media counts for each SST 130 of the store, store managers can piggyback cash service calls together to take care of multiple SSTs 130 at once such as when one requires media replenishment/removal, and another SST 130 is approaching a media replenishment/removal need.

In an embodiment, maintenance manager 115 maintains an optimal count by currency and coin denomination for each SST 130. Maintenance manager 115 compares the real-time media denominations against their corresponding optimal count and color codes the real-time media denomination counts by SST 130 within the SST currency count dashboard interface 124. This allows the store manager to visually and readily discern when media denominations for any given SST 130 are approaching a situation that is going to require media replenishment/removal before the SST is taken out of service because a maximum or minimum media denomination count is reached. This also allows the store manager to maintain and to manage optimal media denomination counts in each of the store's SSTs 130.

Maintenance manager 115 also keeps track of peripheral errors that have occurred via the CTM 134 over time through the log files. This permits the errors and the frequency of the errors to be categorized as soft or hard faults. Soft faults are errors that do not affect the transaction capabilities of the SSTs 130. So, an SST lane may experience many faults in a row while still functioning. However, hard faults prevent the SST lane from functioning and require intervention. Maintenance manager 115 generates an automated incident and corresponding service record within the maintenance and support system 118 as soon as a hard fault error code is detected in a log file, which further speeds up the process of getting a customer engineer to the store site. Maintenance manager 115 uses pattern recognition algorithms and/or model 114 to determine when a threshold number of soft faults are detected within a given period of time and proactively generates an incident and corresponding service record within the maintenance and support system 118 to address an impending hard fault. Again, maintenance manager 115 can piggyback this preemptive service record with any existing scheduled service call noted in the maintenance and support system 118.

Maintenance manager 115 and model 114 intelligently determine when a service engineer should be dispatched to store to service one or more peripherals 136 of one or more SSTs 130 to optimize uptime of the SSTs 130 of the store, while reducing cost to the maintenance and support provider and the store. In an embodiment, the model 114 is an association rule mining model that discovers patterns in error/warning codes of peripherals 136 and determines relationships relevant to the error/warning codes based on the telemetry data in the log files. By using the sequence of error/warning codes in the log files and the telemetry data, the model 114 learns and understands which errors/warnings cause an SST 130 to go down (soft fault versus hard fault). Additionally, the model 114 ascertains the relationships between specific errors/warnings and the order in which they occur. For example, five occurrences of error code 114-36864 (note box 1 is not inserted) will cause error code 114-240 (note recycler is offline) with a 45% probability. This helps understand the failure process of the CTM 134 and assists maintenance manager 115 in proactively dispatching service engineers when most optimal through the maintenance and support system 118.

For instance, if error code 114-240 prevents the SST 130 from accepting any cash tender or completely prevents the SST 130 from transacting altogether, maintenance manager 115 can create a service record within maintenance and support system 118 to directly and immediately dispatch a service engineer to the corresponding store to fix the issue. However, if error code 114-61697 does not directly affect an SST 130 from accepting cash tenders; maintenance manager 115 can wait until another service record or incident for the store is added to the maintenance and support system 118 and piggyback resolution of error code 114-61697 onto that scheduled service visit. Piggybacking dispatch is when multiple service requests/incidents are grouped together so that a service engineer can resolve all incidents at a store in one visit to the site.

As stated above, maintenance manager 115 links error/warning codes for the peripherals 136 to corresponding knowledge articles housed in the knowledge store 116. This consolidates and streamlines operations for the service engineers on service calls to stores. For example, if error code 114-36864 (note box 1 not inserted) is detected, the knowledge article indicates the resolution for error code 114-36864 is to "push green tab to the left and remove note box, then reinsert the note box and ensure light is green." Because maintenance manager 115 inserts the link to the knowledge article in the service record, the service engineer is prepared with a potential cause of any given error/warning code and the exact trouble-shooting steps needed for resolution from the relevant knowledge article. Additionally for repairs requiring part replacements, the service engineers are prepared by having the part replacements with them before the service visit to the store. This significantly reduces the operational costs due to the elimination of re-trips and expedited repair service calls.

In an embodiment, CTM 134 provides the log files such that agent 135 is not needed. In an embodiment, the SST 130 is capable of being placed in a cashier-assisted mode of operation to operate as a point-of-sale (POS) terminal during which a cashier operates the POS terminal to checkout a customer of a store. In an embodiment, log data collector 113 is not necessary, as either CTM 134 or agent 135 directly writes the log files to a data store or a storage location on cloud 110 which is then monitored by maintenance manager 115.

System 100 improves SST 130 uptime or operational time at stores of retailers. System 100 provides proactive and advance detection of both soft and hard faults generated from CTM 134. System 100 provides store-wide visibility of SST 130 status and media counts by denomination per SST 130 of the store. Further, system 100 provides clear and concise resolution steps to service engineers on service visits, provides proactive service call dispatches, resolves issues in advance of reporting by a given store thereby exceeding the service-level agreement (SLA) with the store, and enables piggybacking onto existing scheduled service calls to address impending, predicted, and other service issues with SSTs 130 of the store which were not originally associated with the existing scheduled service calls.

Figure 2:
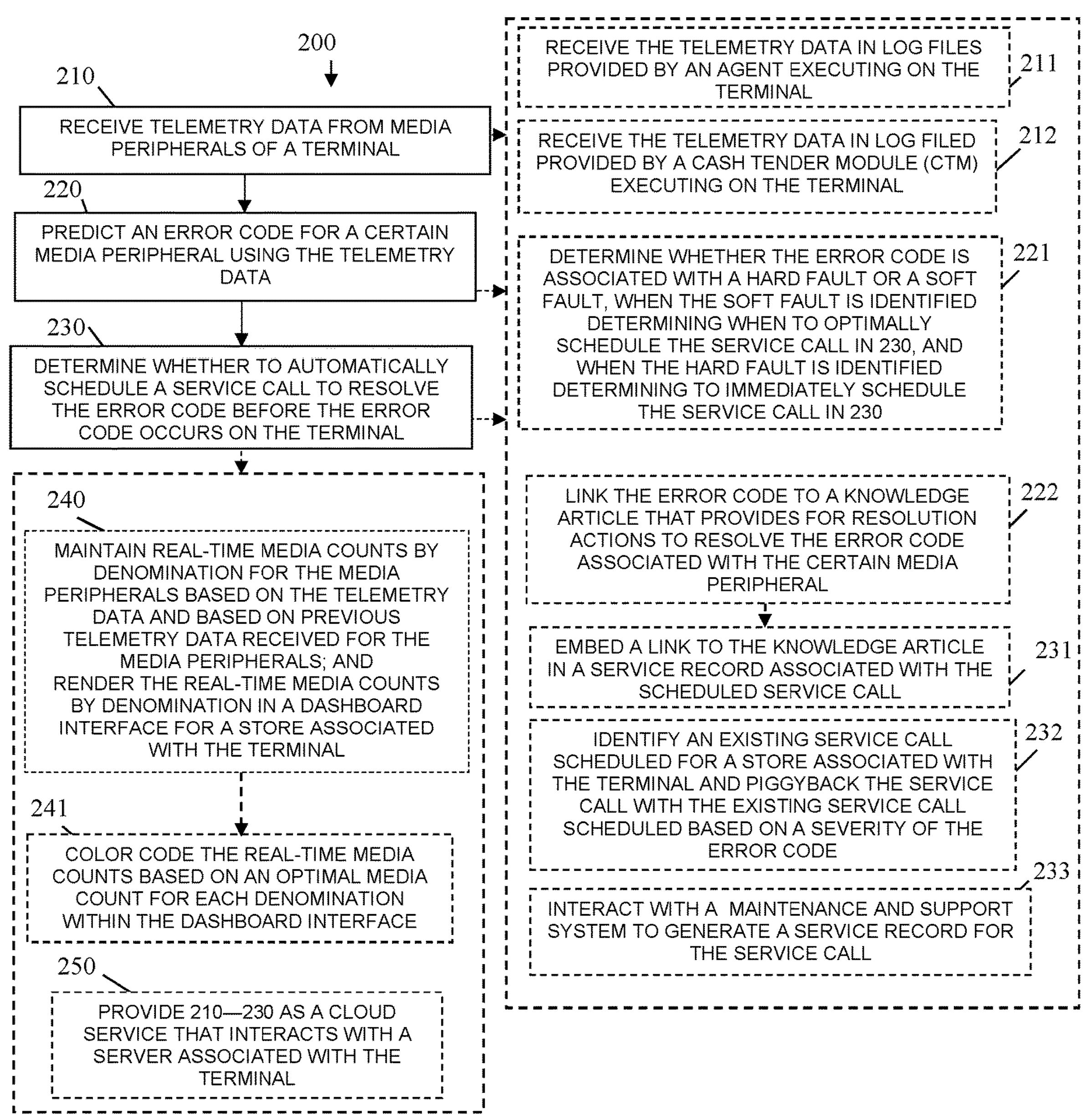
FIG. 2 is a flow diagram of a method for SST predictive error analysis, according to an example embodiment.

The above-referenced embodiments and other embodiments are now discussed with reference to FIGS. 2 and 3. FIG. 2 is a diagram of a method 300 for SST predictive error analysis, according to an example embodiment. The software module(s) that implements the method 200 is referred to as a "proactive transaction terminal media support manager." The proactive transaction terminal media support manager is implemented as executable instructions programmed and residing within memory and/or a non-transitory computer-readable (processor-readable) storage medium and executed by one or more processors of one or more devices. The processor(s) of the device(s) that executes the proactive transaction terminal media support manager are specifically configured and programmed to process the proactive transaction terminal media support manager. The proactive transaction terminal media support manager may have access to one or more network connections during its processing. The network connections can be wired, wireless, or a combination of wired and wireless.

In an embodiment, the device that executes the proactive transaction terminal media support manager is cloud 110. In an embodiment, the proactive transaction terminal media support manager is 113, 114, 115, 116, and/or 117.

At 210, the proactive transaction terminal media support manager receives telemetry data from media peripherals 136 of a terminal 130. In an embodiment, at 211, the proactive transaction terminal media support manager receives the telemetry data in log files provided by an agent 135 executing on the terminal 130. In an embodiment, at 212, the proactive transaction terminal media support manager receives the telemetry data in log files provided by a CTM 134 executing on the terminal 130.

At 220, the proactive transaction terminal media support manager predicts an error code for a certain media peripheral 136 using the telemetry data. In an embodiment, at 221, the proactive transaction terminal media support manager determines whether the error code is associated with a hard fault or a soft fault. When the soft fault is identified, the proactive transaction terminal media support manager determines when to optimally schedule the service call at 230. When the hard fault is identified, the proactive transaction terminal media support manager determines to immediately schedule the service call at 230. In an embodiment, at 222, the proactive transaction terminal media support manager links the error code to a knowledge article that provides for resolution actions to resolve the error code associated with the certain media peripheral 136.

At 230, the proactive transaction terminal media support manager determines whether to automatically schedule a service call to resolve the error code before the error code occur on the terminal 130. In an embodiment of 222 and 230, at 231, the proactive transaction terminal media support manager embeds a link to the knowledge article in a service record associated with the scheduled service call.

In an embodiment, at 232, the proactive transaction terminal media support manager identifies an existing service call schedules for a store associated with the terminal 130. The proactive transaction terminal media support manager piggybacks the service call with the existing service call scheduled based on a severity of the error code. In an embodiment, at 233, the proactive transaction terminal media support manager interacts with a maintenance and support system 118 to generate a service record for the service call.

In an embodiment, at 240, the proactive transaction terminal media support manager maintains real-time media counts by denomination for the media peripherals 136 based on the telemetry data and based on previous telemetry data received for the media peripherals 136. The proactive transaction terminal media support manager renders the real-time media counts by denomination in a dashboard interface 124 for a store associated with the terminal 130.

In an embodiment of 240 and at 241, the proactive transaction terminal media support manager color cods the real-time media counts based on an optimal media count for each denomination within the dashboard interface 124. In an embodiment, at 250, the proactive transaction terminal media support manager (i.e., 210-230) is provided as a cloud service that interacts with a server or device 120 associated with the terminal 130.

Figure 3:
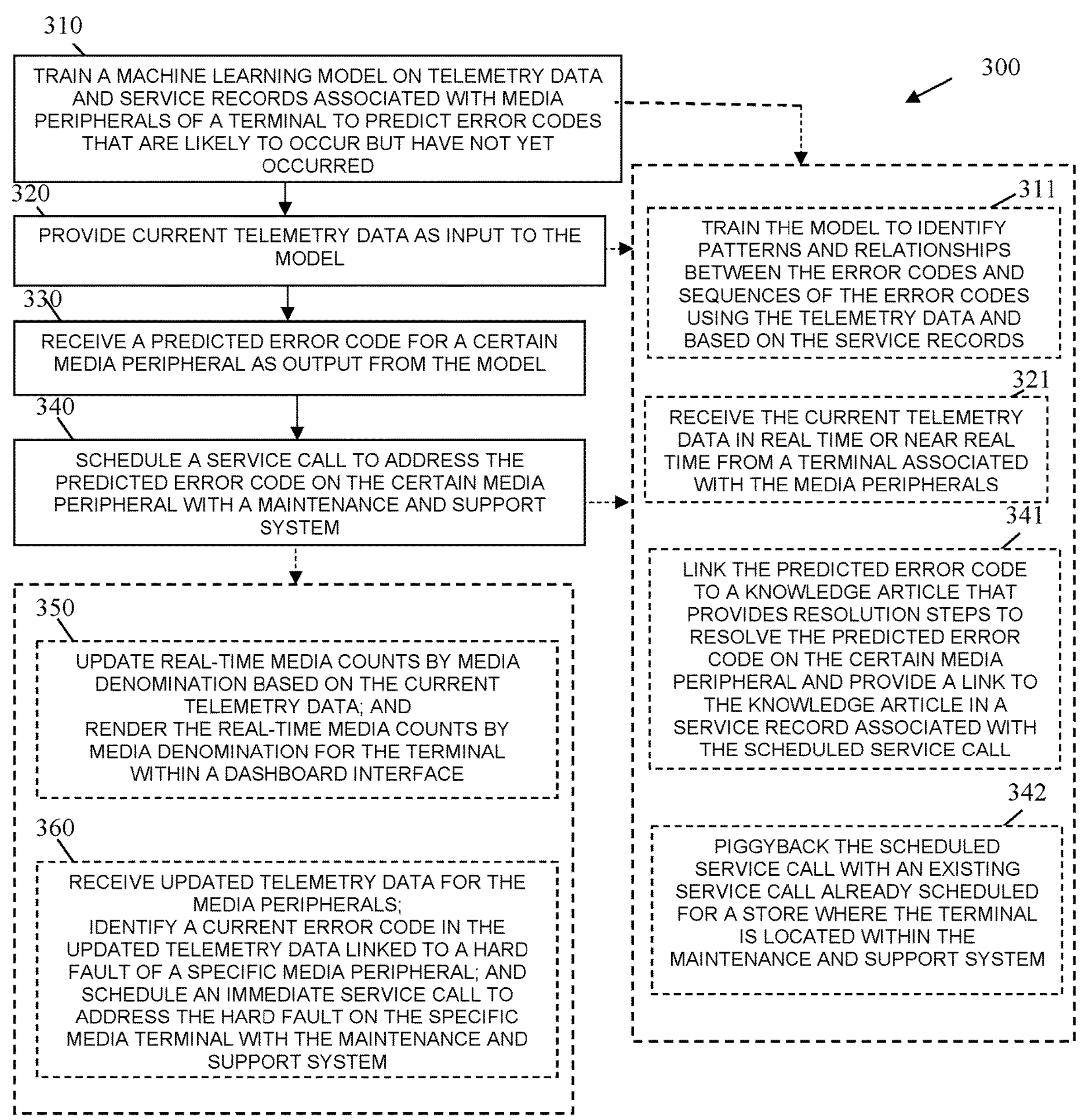
FIG. 3 is a flow diagram of another method for SST predictive error analysis, according to an example embodiment.

FIG. 3 is a diagram of another method 300 for SST predictive error analysis, according to an example embodiment. The software module(s) that implements the method 300 is referred to as a "predictive terminal media support manager." The predictive terminal media support manager is implemented as executable instructions programmed and residing within memory and/or a non-transitory computer-readable (processor-readable) storage medium and executed by one or more processors of one or more device(s). The processors that execute the predictive terminal media support manager are specifically configured and programmed for processing the predictive terminal media support manager. The predictive terminal media support manager may have access to one or more network connections during its processing. The network connections can be wired, wireless, or a combination of wired and wireless.

In an embodiment, the device that executes the predictive terminal media support manager is cloud 110. In an embodiment, the predictive terminal media support manager is 113, 114, 115, 116, 117, 124, 134, 135, and/or method 200. The predictive terminal media support manager presents another and, in some ways, enhanced processing perspective from that which were discussed above for system 100 and method 200.

At 310, the predictive terminal media support manager trains a model 114 on telemetry data and service records associated with media peripherals 136 of a terminal 130 to predict error codes that are likely to occur but have not yet occurred. In an embodiment, at 311, the predictive terminal media support manager trains the model 114 to identify patterns and relationships between the error codes and sequences of the error codes using the telemetry data and based on the service records.

At 320, the predictive terminal media support manager provides current telemetry data as input to the model 114. In an embodiment, at 321, the predictive terminal media support manager receives the current telemetry data in real time or near real time from the terminal 130 associated with the media peripherals 136.

At 330, the predictive terminal media support manager receives a predicted error code for a certain media peripheral 136 as output from the model 114. At 340, the predictive terminal media support manager schedules a service call to address the predicted error code on the certain media peripherals 136 with a maintenance and support system 118.

In an embodiment, at 341, the predictive terminal media support manager links the predicted error code to a knowledge article that provides resolution steps to resolve the predicted error code on the certain media peripheral 136. The predictive terminal media support manager provides a link to the knowledge article in a service record associated with the scheduled service call.

In an embodiment, at 342, the predictive terminal media support manager piggybacks the scheduled service call with an existing service call already scheduled for a store where the terminal 130 is located within the maintenance and support system 118. This reduces service calls made to the store.

In an embodiment, at 350, the predictive terminal media support manager updates real-time media counts by media denomination based on the current telemetry data. The predictive terminal media support manager renders the real-time media counts by media denomination for the terminal 130 within a dashboard interface 124.

In an embodiment, at 360, the predictive terminal media support manager receives updated telemetry data for the media peripherals 136. The predictive terminal media support manager identifies a current error code in the updated telemetry data linked to a hard fault of a specific media peripheral 136. The predictive terminal media support manager schedules an immediate service call to address the hard fault on the specific media peripheral 136 with the maintenance and support system 118.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

receiving telemetry data for media peripherals of a terminal, wherein the media peripherals accept and dispense currency;

predicting an error code for a certain media peripheral using the telemetry data by providing the telemetry data as input to a machine-learning model to identify sequences of error codes specific to media peripheral failures and receiving the predicted error code as output from the machine-learning model, wherein the predicted error code includes a predicted time period within which the error code is expected to occur; and determining whether to automatically schedule a service call to resolve the error code before the error code occurs on the terminal;

wherein determining further includes:

identifying an existing service call scheduled for a store associated with the terminal and piggybacking the service call with the existing service call scheduled based on a severity of the error code, wherein the severity of the error code is a hard fault or a soft fault, the hard fault indicating that the terminal is unable to perform a currency transaction and the soft fault indicating that the terminal is able to perform the currency transaction.

2. The method of claim 1, wherein receiving further includes receiving the telemetry data in log files provided by an agent executing on the terminal.

3. The method of claim 1, wherein receiving further includes receiving the telemetry data in log files provided by a cash tender module executing on the terminal.

4. The method of claim 1, wherein determining further includes immediately scheduling the service call when the severity of the error code is the hard fault.

5. The method of claim 1, wherein predicting further includes linking the error code to a knowledge article that provides for resolution actions to resolve the error code associated with the certain media peripheral.

6. The method of claim 5, wherein determining further includes embedding a link to the knowledge article in a service record associated with the existing service call that is scheduled.

7. The method of claim 1, wherein determining further includes interacting with a maintenance and support system to generate a service record for the service call.

8. The method of claim 1 further comprising:

maintaining real-time currency counts by denomination for the media peripherals based on the telemetry data and based on previous telemetry data received for the media peripherals; and rendering the real-time currency counts by denomination in a dashboard interface for a store associated with the terminal.

9. The method of claim 8 further comprising, color coding the real-time currency counts based on an optimal currency count for each denomination within the dashboard interface.

10. The method of claim 1 further comprising, providing the method as a cloud service that interacts with a server associated with the terminal.

11. A method, comprising:

training a machine learning model (model) on telemetry data specific to currency peripheral operations and service records associated with media peripherals of a terminal to predict error codes that are likely to occur but have not yet occurred on the media peripherals by training the model to identify patterns and relationships between error codes and sequences of the error codes using telemetry data and based on service records, wherein the patterns identify when media peripherals will be unable to accept or dispense currency;

providing current telemetry data as input to the model;

receiving a predicted error code for a certain media peripheral as output from the model, wherein the predicted error code includes a future time period during which the predicted error code is expected to occur; and scheduling a service call to address the predicted error code on the certain media peripheral with a maintenance and support system;

wherein scheduling further includes:

piggybacking the service call that is scheduled with an existing service call already scheduled for a store where the terminal is located within the maintenance and support system when the existing service call is scheduled to occur before the future time period.

12. The method of claim 11 further comprising:

updating real-time currency counts by currency denomination based on the current telemetry data; and rendering the real-time currency counts by currency denomination for the terminal within a dashboard interface.

13. The method of claim 11 further comprising:

receiving updated telemetry data for the media peripherals;

identifying a current error code in the updated telemetry data linked to a hard fault of a specific media peripheral; and scheduling an immediate service call to address the hard fault on the specific media peripheral with the maintenance and support system.

14. The method of claim 11, wherein providing further includes receiving the current telemetry data in real time or near real time from the terminal.

15. The method of claim 11, wherein scheduling further includes linking the predicted error code to a knowledge article that provides resolution steps to resolve the predicted error code on the certain media peripheral and providing a link to the knowledge article in a service record associated with the service call that is scheduled.

16. A system, comprising:

at least one server comprising a processor and a non-transitory computer-readable storage medium;

the non-transitory computer-readable storage medium comprises executable instructions; and the executable instructions when executed on the processor cause the processor to perform operations comprising:

using telemetry data associated with media peripherals of a terminal to predict an error code that has not yet occurred on a certain media peripheral of a terminal by training a machine-learning model on the telemetry data and service records specific to media peripheral failures to predict error codes and sequences of error codes that will render a particular media peripheral unable to accept or dispense currency, and providing the telemetry data as input to the machine-learning model;

linking the error code to a knowledge article that provides descriptive steps for resolving the error code on the certain media peripheral;

generating a service record that includes the error code and a predicted time frame when the error code will occur, and scheduling a service call to a certain media terminal to resolve the error code in advance of the error code being reported from the terminal;

providing a link to the knowledge article within the service record; and determining whether the error code is associated with a hard fault that prevents currency transactions or a soft fault that does not prevent currency transactions, when the soft fault is identified determining when to optimally schedule the service call, and when the hard fault is identified determining to immediately schedule the service call.

17. The system of claim 16, wherein the terminal is a self-service terminal.

* * * * *